United States Patent [19]

Hiroyasu et al.

[11] Patent Number: 4,545,706
[45] Date of Patent: Oct. 8, 1985

[54] METHOD AND MACHINE FOR MACHINING THE SURFACE OF A VALVE SEAT

[75] Inventors: Minoru Hiroyasu, Saitama; Shigeru Yamagishi; Hideo Yamashita, both of Tokyo; Susumu Yamada; Koji Takahashi, both of Saitama, all of Japan

[73] Assignee: Honda Giken Kogyo Kabushiki Kaisha, Tokyo, Japan

[21] Appl. No.: 441,512

[22] PCT Filed: Mar. 5, 1982

[86] PCT No.: PCT/JP82/00060
§ 371 Date: Oct. 27, 1982
§ 102(e) Date: Oct. 27, 1982

[87] PCT Pub. No.: WO82/03032
PCT Pub. Date: Sep. 16, 1982

[30] Foreign Application Priority Data

Mar. 7, 1981 [JP] Japan ............................. 56-31937

[51] Int. Cl.⁴ ..................... B23B 35/00; B23B 41/12
[52] U.S. Cl. ........................... 408/1 BD; 51/241 VS; 408/130; 408/180; 408/224; 408/83.5
[58] Field of Search ................ 408/75, 79, 92, 709, 408/1 BD, 80, 81, 82, 99, 115 R, 708, 224, 225, 83.5; 29/26 A, 26 B; 51/241 VS

[56] References Cited

U.S. PATENT DOCUMENTS

| | | | |
|---|---|---|---|
| 2,065,486 | 12/1936 | Albertson | 408/709 X |
| 2,864,268 | 12/1958 | Anderson | 408/79 |
| 3,331,266 | 7/1967 | Brooks | 408/80 |
| 3,333,487 | 8/1967 | Parry | 408/80 |
| 3,764,204 | 10/1973 | Kammeraad | 408/75 |
| 3,923,413 | 12/1975 | Giles | 408/115 B X |
| 4,147,462 | 4/1979 | Appleby et al. | 408/80 |

Primary Examiner—William R. Briggs
Assistant Examiner—Glenn L. Webb
Attorney, Agent, or Firm—Irving M. Weiner; Joseph P. Carrier; John J. Cantarella

[57] ABSTRACT

A method and machine for machining the surface of a valve seat (3) which is required to have a very accurate alignment with respect to a guide bore of a valve guide (2).

In order to be capable of machining the valve seat surface in high roundness while maintaining a high concentricity with the guide bore, a pilot member (4) is moved forward inclinably to catch a guide bore of a valve guide (2) at its front end; the pilot member is further moved forward bendably while following the guide bore; when the pilot member has reached the desired position, the posture of the pilot member in the position is firmly held; and the surface of the valve seat (3) is machined by moving edged tool members (5a) forwardly while rotating the edged tool members (5a) which are arranged coaxially with the pilot member. A machine for practicing the method includes a forwardly and backwardly movable spindle (8), a pilot member (4) bendable at (7) with respect to the spindle, a bearing member (15) for the pilot member provided alignably with respect to the pilot member, an arrangement (17) for holding the bearing member coaxially with the pilot member, and edged tool members (5a) arranged to be rotatable coaxially with the pilot member and movable forwardly and backwardly together with the pilot member.

7 Claims, 6 Drawing Figures

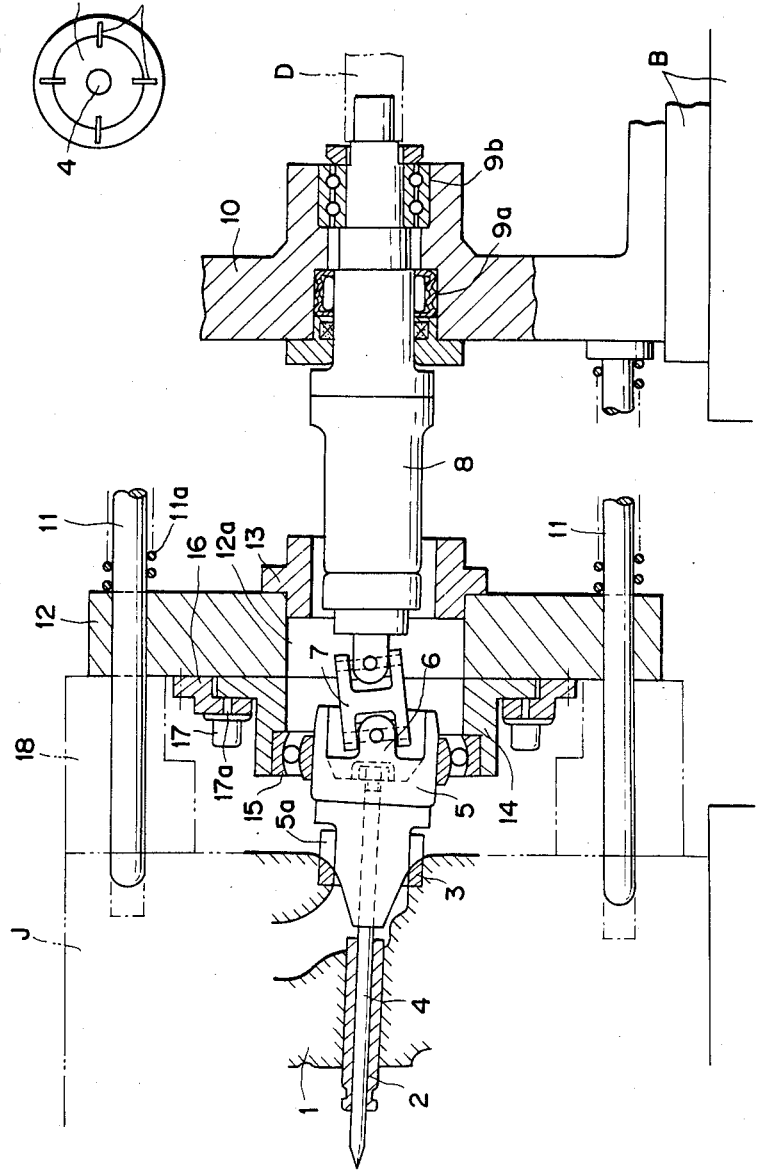

METHOD AND MACHINE FOR MACHINING THE SURFACE OF A VALVE SEAT

FIELD OF ART

The present invention relates to a method and machine for machining the surface of a valve seat. More particularly, the invention is concerned with a method and machine for machining the surface of a valve seat which is required to have a very accurate alignment with respect to the guide bore for the valve stem, such as a valve seat in the cylinder head of an internal combustion engine.

BACKGROUND ART

In a 4-cycle internal combustion engine, in general, as shown in FIG. 4, a valve guide 120 made of cast iron for supporting a stem 111 of intake and exhaust valves 110 and a valve seat 130 made of a hard material such as a sintered alloy are fitted in predetermined positions of a cylinder head 100. As shown in FIG. 5, the valve seat 130 usually has a seat surface comprising a mouth surface 131 which has a vertical angle of 120° in an imaginary cone described around an axis 112 of the stem 111 as an axis of rotation, a valve contact surface 132 which has a vertical angle of 90° in the imaginary cone and an inner surface 133 which has a vertical angle of 60° in the cone, provided there are some valve seats wherein the seat surface comprises only the valve contact surface 132 having a vertical angle of 90°. Where it is necessary to maintain air-tightness against a violent motion and a high compressive force such as in the intake and exhaust valves in the cylinder head of an internal combustion engine, close attention is paid to finishing the inner surface of the guide bore of such valve guide and the seat surface of such valve seat, and particularly a high roundness of the valve seat surface itself and an alignment of high accuracy relative to the valve guide bore are required in finishing the valve seat surface.

In view of the foregoing requirements, various machining methods have heretofore been adopted, which are broadly classified into the following three methods.

(1) Using a jig borer or the like, the valve guide bore is finished with a reamer, then the reamer is removed and a measuring tool such as a dial gauge is attached, followed by measurement while feeding the spindle to effect alignment between the valve guide and the valve seat, and then the measuring tool is replaced by a chamfering cutter and the valve seat surface is chamfered by this cutter.

This method is unsuitable for a multiple spindle machining, and even in machining with a single spindle a fairly large amount of time is required, so the productivity is low and labor saving is not attainable. Therefore, this method has been utilized mainly in small volume production, and is not suitable for medium and large volume production.

(2) The valve guide bore is reamed in a previous step using a separate machine tool, then a pilot bar integral with a chamfering cutter is inserted in the reamed guide bore and the valve contact surface of a valve seat is manually chamfered.

According to this method, at every chamfering of the valve seat surface, it is necessary to effect alignment with the guide bore. Consequently, in case the valve seat is made of a relatively soft material, the working efficiency is not so much affected, but in the case of a hard material, more time is required and it is necessary to machine beforehand the mouth surface and inner surface of the valve seat. Besides, because of manual work, force may be applied non-uniformly in the chamfering operation, so that the alignment of the seat surface relative to the guide bore and the roundness of the seat surface itself are not always perfect. Consequently, after-steps including valve running operation have been required in many cases.

(3) As shown in FIG. 6, a cylinder head 200 is set, with a jig, in a predetermined position of a machine tool, then an outer spindle 270 supporting a cutter head 250 on the outer periphery of which is fixed a chamfering cutter 240, and an inner spindle 280 to which is secured a reamer 260, are moved forwardly integrally with each other to approach the cylinder head 200, and when they have reached predetermined positions, only the inner spindle 280 is moved forwardly while being supported by the inner surface of the cutter head 250 and the guide bore of a valve guide 220 is finished with the reamer 260, and then the outer spindle 270 is moved slightly forward to chamfer the seat surface of the valve seat 230.

This method is suitable for medium and large volume production and has been mainly adopted at present. However, in the foregoing methods (1) and (2), even when there is a small deviation in the fitting condition of the valve guide relative to the cylinder head, that is, even when the guide bore is not positioned as designed, the chamfering of the valve seat is performed after making a setting corresponding to the deviation of the guide bore by alignment with the guide bore, while in the method (3), the guide bore and the seat surface are machined according to predetermined dimensions from reference positions regardless of variation in the guide bore position. As a result, when machining a prepared bore for the valve guide, if the prepared bore is not positioned accurately, there will occur non-uniformity in the radial allowance, namely, the so-called thickness deviation, at the time of reaming and this thickness deviation acts on the cutting edge of the reamer as a non-uniform, cutting reaction force in the radial direction, so that as the long and slender reamer is moved forwardly, not only the inclination of the reamer increases but also the degree of eccentricity with respect to the prepared bore increases. Therefore, the concentricity between the guide bore and the valve seat has heretofore not been easily attainable. Besides, the corresponding machine tool is inevitably a double coaxial spindle type because of the necessity of feeding the reamer and the cutter separately, so that the diameter of the outer spindles becomes larger and hence the number of spindle per machine becomes relatively small. Therefore, in order to finish a workpiece such as particularly a multiple-cylinder engine cylinder head with high working efficiency, a plurality of work stations have heretofore been needed.

DISCLOSURE OF THE INVENTION

With a view to effectively solving the above-mentioned problems associated with the conventional machining methods and machines, the inventors have accomplished the present invention.

It is an object of the present invention to provide a method and machine for machining the surface of a valve seat in a cylinder head of an internal combustion engine which is required to have an extremely accurate alignment relative to a guide bore for a valve stem, and a high roundness of the seat surface while maintaining the seat surface at a high concentricity with the guide bore.

It is another object of the present invention to provide a method and machine for machining the aforesaid valve seat surface which is also capable of finishing the bore of the valve guide at a small allowance without inclination of the reamer.

It is a further object of the present invention to provide a method and machine for machining the valve seat surface and capable of performing the aforesaid finishing operations in a simple manner and with a simple construction, respectively, and hence with a low required man-hour time and at low cost.

To attain the above-mentioned objects, the present invention provides a method for machining the surface of a valve seat, which comprises the steps of setting a workpiece including a valve guide and a valve seat, moving a pilot member forwardly while guiding it inclinably and having a guide bore of the valve guide caught by the tip end of the pilot member, further moving the pilot member forwardly allowing it to be bendable with respect to the direction of the spindle while following the guide bore, retaining the posture of the pilot member by holding its rear portion firmly, moving at least one edged tool member forwardly, coaxially with the pilot member while rotating it to thereby machine the surface of the valve seat, moving the pilot member and the edge tool member backwardly, and removing the workpiece.

The present invention further provides a method for machining the surface of a valve seat according to the above method wherein the step of moving the pilot member bendably forward includes a step of reaming the guide bore.

The present invention also provides a machine tool for machining the surface of a valve seat, comprising at least one spindle capable of being moved forwardly and backwardly, a pilot member capable of bending with respect to the spindle, a guide member capable of guiding the pilot member while forming clearance, a bearing member capable of bearing the pilot member so as to be alignable with respect to the pilot member, means for holding the bearing member coaxially with the pilot member, and at least one edged tool member disposed so as to be rotatable coaxially with the pilot member by the spindle.

The present invention further provides a machine tool for machining the surface of a valve seat according to the above machine tool wherein the pilot member has a reamer member.

BRIEF DESCRIPTION OF THE DRAWINGS

FIG. 2 is a partially cutaway side view of the machine tool of FIG. 1, showing a machining state.

FIG. 3 is a front view taken on line X—X of FIG. 1.

BEST FORM FOR PRACTICING THE INVENTION

A preferred embodiment of the present invention will be described hereinunder with reference to the accompanying drawings.

Figure 1:
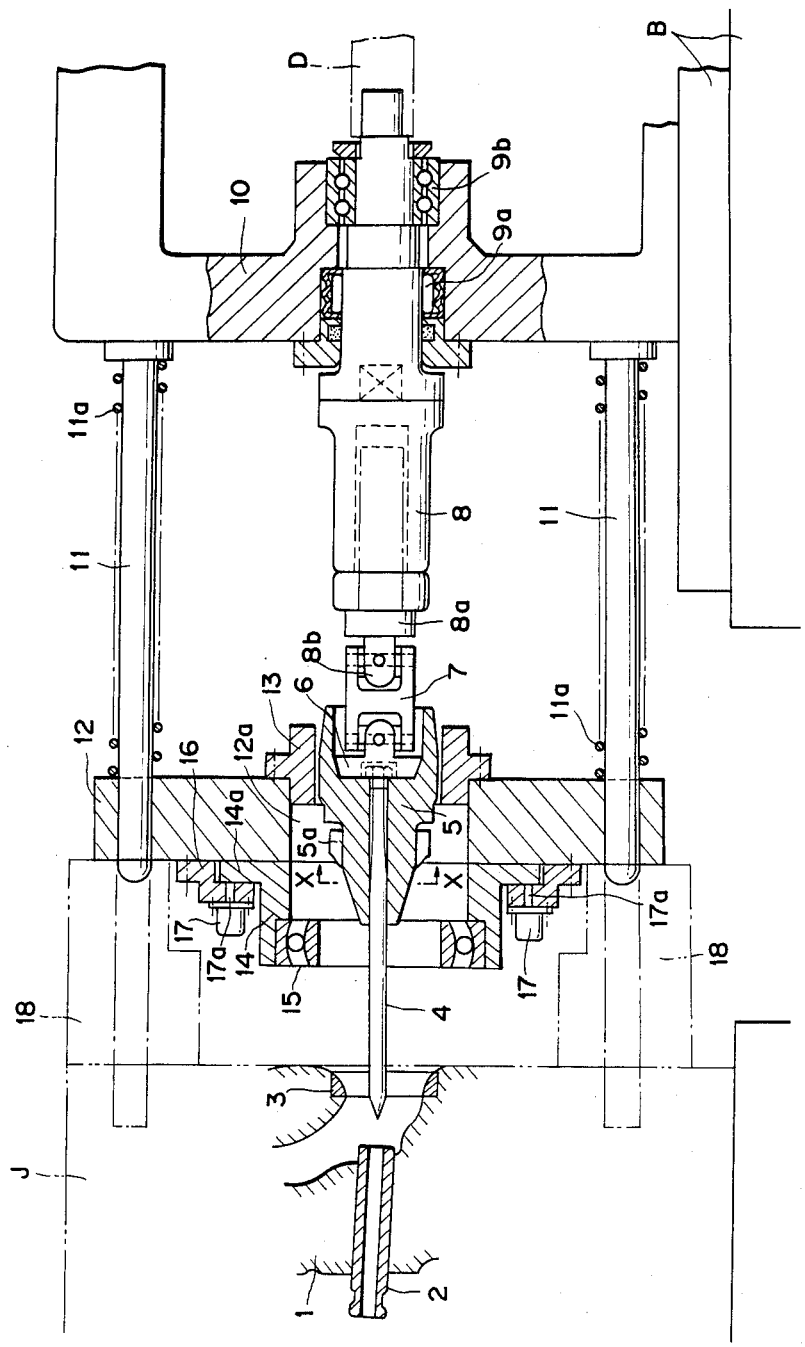
FIG. 1 is a partially cutaway side view of a machine tool according to a preferred embodiment of the present invention, showing a state just before starting operation.
Figure 4:
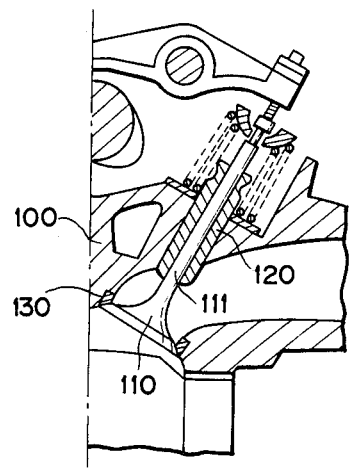
FIG. 4 is a sectional view of part of a cylinder head of an engine.

In FIG. 1, the reference numeral 1 designates a cylinder head positioned and fixed through reference holes to a jig J on a machine tool. A required number of valve guides 2 for supporting the stems of intake and exhaust valves and also a required number of valve seats 3 are press-fitted in predetermined positions of the cylinder head 1. Only one each of the valve guides 2 and valve seats 3 are shown in the drawings.

Figure 5:
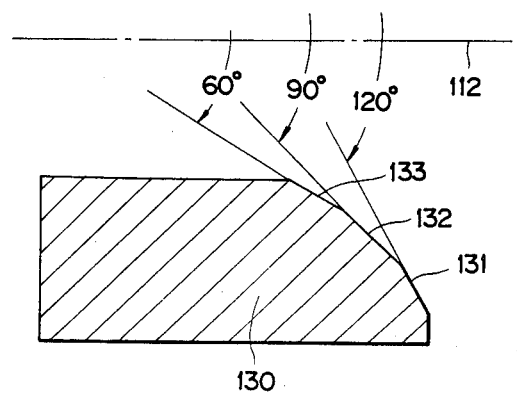
FIG. 5 is an enlarged sectional view of the surface of a valve seat in the cylinder head of FIG. 4.
Figure 6:
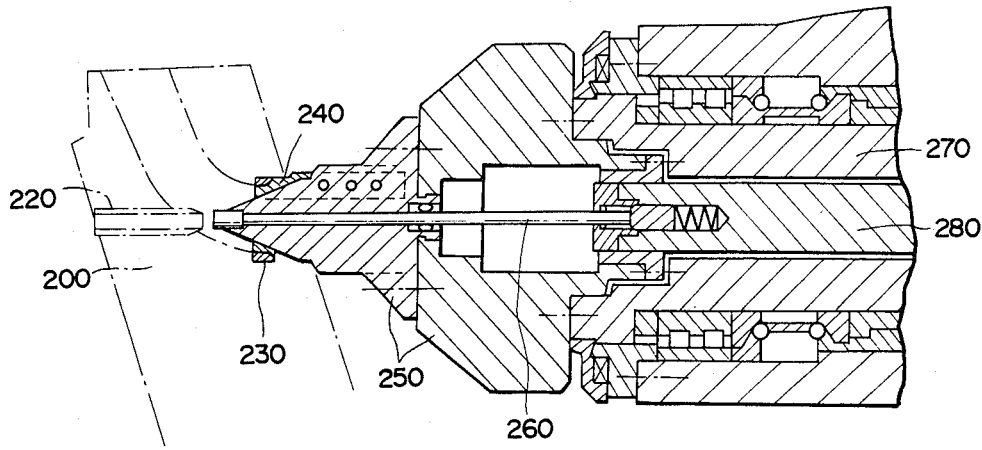
FIG. 6 is a sectional view of part of a conventional machine tool.

Numeral 4 designates a reamer for finishing a guide bore of the valve guide, and its rear end portion is fitted and fixed into a central part of a rotary tool holder 5. The reamer 4 also functions as a pilot member as described hereinbelow. On the outer peripheral surface of a middle portion of the tool holder 5, as shown in FIG. 3, there are mounted a plurality of edged tools 5a such as cutters or cutting tools for machining the surface of the valve seat 3. The edged tools 5a are disposed so that, for example, in FIG. 3, if the top and bottom ones are to machine the valve contact surface at the center of the seat, namely, the portion corresponding to a contact surface 132 in FIG. 5, then either a right or left one machines a mouth surface, namely, the portion corresponding to a mouth surface 131 in FIG. 5, and the other machines an inner surface, namely, the portion corresponding to an inner surface 133 in FIG. 5. The number of the edged tools 5a is not limited to that shown in FIG. 3, and such member can be suitably selected. For example, in the case of a valve seat designed to have a valve contact surface alone, only one edged tool may be provided.

A bifurcated connection piece 6 is mounted within a larger-diameter rear portion of the edged tool holder 5, and is connected through a pin or the like to one end of a universal joint 7. The other end of the universal joint 7 is connected through a pin or the like to a bifurcated piece 8b at a front end of a spindle core 8a which is threadedly fixed to a spindle 8 so that its axial position can be adjusted.

The spindle 8 is disposed so as to be slidable back and forth, namely, to the right and left in FIG. 1, on a bed B of the machine tool, and is supported through bearings 9a and 9b by a multiple spindle head 10, the multiple spindle head 10 supporting a plurality of spindles 8 corresponding to the number of valves. A rear end of the spindle 8 is connected to a driving shaft D. Attached to the front of the multiple spindle head 10 are a plurality of guide bars 11 which are parallel to the spindle 8 and which are fitted in and slidably supported by a support plate 12, the support plate 12 having a centrally located circular hole 12a. A spring 11a having a required strength is wound round each of the guide bars 11, with both ends of the spring 11a being anchored at the front of the multiple spindle head 10 and at the back of the support plate 12. While the machine tool is not in operation, the support plate 12 is disposed in a position corresponding to a natural length of the spring 11a. In FIG. 1, the support plate 12 has shifted from such a non-operative state to a state just before machining. In a non-operative state, the support plate 12 is retracted together with the multiple spindle head 10 to the right from the position shown in FIG. 1.

At a central part of the back of the support plate 12 a guide bush 13 is fixed by being fitted in the circular hole 12a. Prior to the machining operation, the larger-diameter rear portion of the tool holder 5 is accommodated within the guide bush 13 through a small clearance formed therebetween.

On the other hand, at a central front part of the support plate 12 a tubular bearing holder 14 is disposed so as to be slidable in the radial direction of the circular hole 12a, and a flange portion 14a thereof is held by a locking plate 16 fixed to the front of the support plate 12 and can be locked whenever required by pistons 17a of a plurality of locking cylinders 17. On the other hand, an outside portion of a self-aligning bearing 15 is fixed to the inside of a front end portion of the bearing holder 14, the inner surface which defines an inside diameter of the self-aligning bearing 15 being disposed so that the outside of the larger-diameter rear portion of the tool holder 5 can be slidably inserted therein.

In the drawings, numeral 18 designates a guide post which projects from the surface of the jig J.

In the state of FIG. 1 wherein the multiple spindle head 10 is in its forward position, the support plate 12 is in abutment with the guide posts 18 and the tip end of the reamer 4 is close to the valve guide 2. If the multiple spindle head 10 is advanced while rotating the spindle 8, the tool holder 5 supporting the reamer 4 advances while being guided by the guide bush 13 and the tip end of the reamer 4 enters the guide bore of the valve guide 2 while catching the same bore. In this case, it is preferable that the tip end of the reamer 4 be pointed as shown in FIG. 1, because it becomes easier for the reamer 4 to get into the guide bore even when the reamer 4 somewhat vibrates.

If the structure is designed so that upon entering of the tip end of the reamer 4 into the guide bore the larger-diameter rear portion of the tool holder 5 moves away from the guide bush 13, then the tool holder 5 supporting the reamer 4 bendably follows the reamer 4 because it is bendably connected to the spindle 8 through the universal joint 7, and even if there is a small deviation in the guide bore position of the valve guide 2, the reamer 4 can effect finishing of the inner surface while freely moving eccentrically and fitting well in the guide bore. Consequently, inclination of the reamer will not occur since an excessive force is not exerted on the reamer 4, and the guide bore can be finished well at a minimized allowance.

Along with advancement of the reamer 4 the larger-diameter rear portion of the tool holder 5 fits in the self-aligning bearing 15 and is thereby supported, and subsequent inclinations and positional changes in the radial direction of the tool holder 5 along with further advancement of the reamer 4 are absorbed by the aligning action of the self-aligning bearing 15 and by fine adjusting movements of the bearing holder 14 with respect to the support plate 12, whereby the concentricity between the tool holder 5 and the reamer 4 is maintained and the twisting of the reamer 4 is prevented.

When the reamer has advanced up to the position to which it is finishing following the guide bore of the valve guide 2, the locking cylinders 17 are actuated by feeding a pressure fluid thereto, allowing the respective piston pins 17a to fix the bearing holder 14 in a certain position with respect to the support plate 12.

At this time, the larger-diameter rear portion of the tool holder 5 is supported so as to be stable by the self-aligning bearing 15 and is in a highly accurately aligned state with respect to the guide bore of the valve guide 2 together with the reamer 4. On the other hand, the edged tools 5a on the tool holder 5 are close to the valve seat 3.

In this state, if the multiple spindle head 10 is further advanced while rotating the spindle 8, the edged tools 5a will abut the surface of the valve seat 3 and chamfer it while reaming of the guide bore is being performed by reamer 4.

In this case, the tool holder 5 and the reamer or pilot member 4 functions as a supporting shaft for the edged tools 5a, and the valve guide 2 functions as a front-side bearing for the edged tools 5a while the self-aligning bearing 15 serves as a rear-side bearing, so that the edged tools 5a are supported on opposite sides and the cutting reaction force thereagainst is exerted on the intermediate portion thereof. Besides, the distance between the bearing portions is short. Consequently, the seat surface of the valve seat 3 can be chamfered in high roundness and high concentricity with respect to the valve guide bore.

In the case of the cylinder head 1 wherein the guide bore of the valve guide 2 has been finished in advance, the reamer 4 may be replaced by a pilot bar (not shown) of the same shape and same size as the reamer 4, whereby the same bearing function as described above can be attained in machining the seat surface.

Moreover, the tool holder 5 and the spindle 8 may be connected through a flexible shaft in place of the universal joint 7, and also in this case it is possible to attain the same aligning function as described above with respect to the guide bore.

According to the present invention, as will be apparent from the foregoing, a reamer or a pilot bar can be fitted well in the guide bore position of a valve guide, and when machining the seat surface of a valve seat, the reamer or the pilot bar functions as a supporting shaft for edged tools and the edged tools are supported on both sides thereof by the valve guide and a self-aligning bearing, so that the seat surface can be machined efficiently while maintaining a high roundness and a high concentricity with respect to the stem bore. Moreover, because the cutting reaction force can be fully resisted, a mouth surface and an inner surface can be machined simultaneously with the valve contact surface without the need to machine them separately. Besides, since the self-aligning bearing bears a radial force, the spindle may bear only a rotation force and a thrust and therefore may be of a smaller diameter. Furthermore, unlike conventional machines, it is not necessary for the spindle to be a double coaxial spindle, and therefore the machine tool can be made smaller in size.

POSSIBILITY OF INDUSTRIAL UTILIZATION

According to the present invention, the valve seat surface can be finished in high roundness while maintaining a high concentricity with a valve guide bore, in a simple manner and with a simple mechanical construction.

According to the present invention, therefore, the machining of a valve seat in the cylinder head of an internal combustion engine, which is required to have an extremely accurate alignment with respect to a valve guide bore, can be effected with a low man-hour time and at low cost while maintaining a severe tolerance.

We claim:

1. A method for machining the surface of a valve seat, which comprises the steps of:

setting a workpiece containing a valve guide and said valve seat;

moving a rotary holder toward said workpiece, which rotary holder has a pilot member and an edged tool member both fixed on said rotary holder, while guiding said rotary holder inclinably and having a guide bore of said valve guide caught by a front end of said pilot member, said pilot member being a reamer;

further moving said rotary holder toward said workpiece allowing said rotary holder to be bendable with respect to the direction of a spindle while following said guide bore and while reaming said guide bore;

retaining the posture of said rotary holder by holding its rear portion firmly;

further moving said rotary holder toward said workpiece, while rotating said rotary holder, thereby allowing said edged tool member to machine the surface of said valve seat while said guide bore is reamed;

moving said rotary holder away from said workpiece; and removing said workpiece.

2. A machining method according to claim 1, wherein said step of retaining the posture of said rotary holder includes a step of coaxially bearing said rotary holder.

3. A machining method according to claim 1, wherein said step of machining said valve seat surface comprises a step of chamfering and finishing a valve contact surface of said valve seat.

4. A machine tool for machining the surface of a valve seat, comprising:

at least one spindle which is movable forwardly and backwardly;

a rotary holder which is bendable with respect to and rotatable by said spindle;

said rotary holder having a pilot member and an edged tool member both fixed thereon, so as to be integrally rotatable with said pilot member and said edged tool member, said pilot member being a reamer;

a guide member which guides said rotary holder while forming a clearance;

a bearing member which bears said rotary holder so as to be alignable with respect to said rotary holder; and means for holding said bearing member coaxially with said rotary member.

5. A machine tool according to claim 4, wherein said rotary holder is connected to said spindle through a universal joint.

6. A machine tool according to claim 4, wherein said rotary holder is connected to said spindle through a flexible shaft.

7. A machine tool according to claim 4, wherein said holding means comprises a plurality of power cylinders disposed outside said bearing member.

* * * * *